(12) United States Patent
Minard et al.

(10) Patent No.: US 9,848,620 B2
(45) Date of Patent: Dec. 26, 2017

(54) FROZEN FOOD DISPENSING MACHINE AND METHOD OF OPERATION

(71) Applicant: Carrier Corporation, Farmington, CT (US)

(72) Inventors: James J. Minard, Roscoe, IL (US); Benjamin A. Vosmek, Machesney Park, IL (US); Stephen M. Wadle, Beloit, WI (US)

(73) Assignee: CARRIER CORPORATION, Farmington, CT (US)

( * ) Notice: Subject to any disclaimer, the term of this patent is extended or adjusted under 35 U.S.C. 154(b) by 30 days.

(21) Appl. No.: 14/410,456

(22) PCT Filed: Apr. 23, 2013

(86) PCT No.: PCT/US2013/037756
§ 371 (c)(1),
(2) Date: Dec. 22, 2014

(87) PCT Pub. No.: WO2014/003881
PCT Pub. Date: Jan. 3, 2014

(65) Prior Publication Data
US 2015/0320079 A1 Nov. 12, 2015

Related U.S. Application Data

(60) Provisional application No. 61/665,434, filed on Jun. 28, 2012.

(51) Int. Cl.
*A23L 3/36* (2006.01)
*F25D 25/00* (2006.01)
(Continued)

(52) U.S. Cl.
CPC .............. *A23G 9/22* (2013.01); *A23G 9/166* (2013.01); *A23G 9/20* (2013.01); *A23G 9/222* (2013.01); *A23G 9/28* (2013.01); *A23G 9/281* (2013.01)

(58) Field of Classification Search
CPC . A23G 9/166; A23G 9/16; A23G 9/20; A23G 9/22; A23G 9/222; A23G 9/28; A23G 9/281; F25D 2400/22
(Continued)

(56) References Cited

U.S. PATENT DOCUMENTS 3,068,889 A 12/1962 Swenson
3,657,011 A 4/1972 Orr
(Continued)

FOREIGN PATENT DOCUMENTS

CN 1780785 A 5/2006
CN 1854060 A 11/2006
(Continued)

OTHER PUBLICATIONS

International Search Report for application PCT/US2013/037756, dated Jul. 29, 2013, 4 pages.
(Continued)

*Primary Examiner* — Joseph Trpisovsky
(74) *Attorney, Agent, or Firm* — Cantor Colburn LLP (57) ABSTRACT

A frozen food dispensing machine includes a refrigerated first zone including a product storage chamber. A second zone is operably connected to the first zone for flowing product from the first zone. A third zone is configured to receive a flow of product from the second zone, freeze the flow of product and dispense the flow of product. The first zone, the second zone and the third zone are isolatable from each other.

9 Claims, 7 Drawing Sheets

(51) Int. Cl.

| | | |
|---|---|---|
| *F25D 13/06* | (2006.01) | |
| *F25B 25/00* | (2006.01) | |
| *A23G 9/00* | (2006.01) | |
| *A23G 9/22* | (2006.01) | |
| *A23G 9/16* | (2006.01) | |
| *A23G 9/20* | (2006.01) | |
| *A23G 9/28* | (2006.01) | |

(58) Field of Classification Search
USPC ...... 62/62, 63, 69, 303, 322, 346; 222/146.6
See application file for complete search history.

(56) References Cited

U.S. PATENT DOCUMENTS

| | | | |
|---|---|---|---|
| 3,733,840 A | | 5/1973 | Pearl |
| 3,969,531 A | * | 7/1976 | Cornelius ............... A23G 9/20 |
| | | | 426/319 |
| 4,089,322 A | | 5/1978 | Guibert |
| 4,363,263 A | | 12/1982 | Williams |
| 4,703,628 A | | 11/1987 | Togashi et al. |
| 4,758,097 A | * | 7/1988 | Iles, Sr. ............... A23G 9/163 |
| | | | 366/102 |
| 5,195,334 A | | 3/1993 | Lang et al. |
| 6,287,515 B1 | | 9/2001 | Koosman et al. |
| 6,490,872 B1 | | 12/2002 | Beck et al. |
| 6,536,224 B2 | | 3/2003 | Frank et al. |
| 6,637,214 B1 | | 10/2003 | Leitzke et al. |
| 7,908,871 B2 | | 3/2011 | Baxter et al. |
| 2002/0043071 A1 | * | 4/2002 | Frank ..................... A23G 9/045 |
| | | | 62/135 |
| 2005/0172952 A1 | | 8/2005 | Williams |
| 2006/0019003 A1 | | 1/2006 | Take et al. |
| 2008/0226779 A1 | | 9/2008 | Cocchi et al. |
| 2009/0145924 A1 | * | 6/2009 | Fiedler ................ B67D 7/0255 |
| | | | 222/95 |
| 2010/0139493 A1 | | 6/2010 | Nevarez et al. |
| 2010/0242497 A1 | * | 9/2010 | Bertone ................ A23G 9/045 |
| | | | 62/1 |
| 2012/0104024 A1 | * | 5/2012 | Anselmino ........... F25D 23/126 |
| | | | 222/1 |

FOREIGN PATENT DOCUMENTS

| | | |
|---|---|---|
| EP | 0401617 A1 | 12/1990 |
| WO | 0070963 A1 | 11/2000 |

OTHER PUBLICATIONS

Written Opinion for application PCT/US2013/037756, dated Jul. 29, 2013, 5 pages.
State Intellectual Property Office of People's Republic China Office Action and Search Report; Application No. 201380033618.1; dated Apr. 29, 2016; 10 pages.

* cited by examiner

FROZEN FOOD DISPENSING MACHINE AND METHOD OF OPERATION

BACKGROUND OF THE INVENTION

The subject matter disclosed herein relates to food dispensing machines. More specifically, the subject matter disclosed herein relates to frozen food dispensing machines and methods of operation thereof.

In a typical frozen food dispensing machine, such as a frozen dessert dispenser, product or product mix, typically in a liquid state is delivered to the machine. The bag is opened, and the product or mix is emptied from the bag into a storage hopper portion of the machine. The hopper stores the product and refrigerates it, without freezing the product. To dispense, the product is flowed from the hopper into a freezing cylinder where it is frozen, then to a dispensing portion where it is dispensed as frozen food. To ensure clean or sanitary conditions of the dispensing machine and the frozen food itself, the machine is either emptied, cleaned and sanitized or sanitized using a heat-treating cycle at a selected interval, usually once per day. Emptying the machine results in considerable waste of product, which is disposed from the machine. The possibility exists of potential contamination or spillage of product emptied into the hopper once the sanitizing steps are complete.

BRIEF DESCRIPTION OF THE INVENTION

In one embodiment, a frozen food dispensing machine includes a refrigerated first zone including a product storage chamber. A second zone is operably connected to the first zone for flowing product from the first zone. A third zone is configured to receive a flow of product from the second zone, freeze the flow of product and dispense the flow of product. The first zone, the second zone and the third zone are isolatable from each other.

In another embodiment, a method of operating a frozen food dispensing machine includes urging a flow of product from a refrigerated first zone into a second zone. The flow of product is conveyed through the second zone and into a third zone via one or more product feed lines. The product is frozen in a freezing cylinder in the third zone, and the product is dispensed from the third zone. The first zone, the second zone and the third zone are isolatable from each other.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawing.

DETAILED DESCRIPTION OF THE INVENTION

Figure 1:
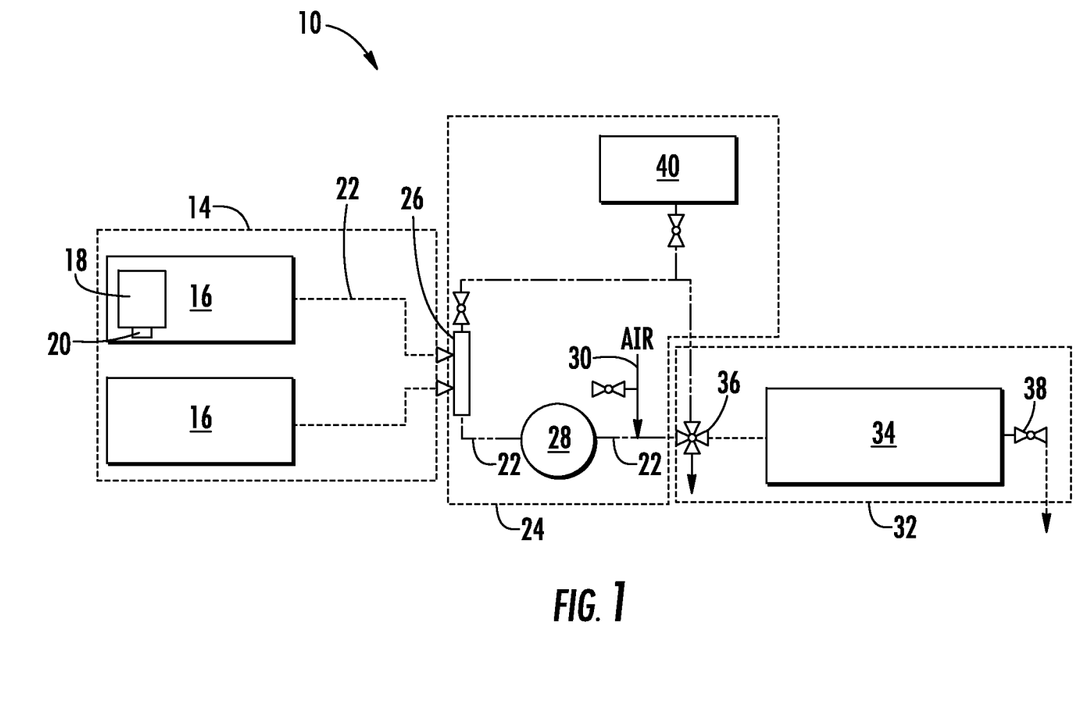
FIG. 1 is a schematic illustration of an embodiment of a frozen food dispenser.

Shown in FIG. 1 is a schematic of a frozen food dispensing machine 10. The machine 10 is configured to have three separate, but operably connected zones. A first zone 14 includes one or more storage chambers 16 to store a volume of liquid product or mix, in a refrigerated state. The storage chambers 16 are configured such that the product may be placed in the storage chambers 16 in a package 18, with for example, a fitting 20 in the storage chamber 16 to connect the package 18 to one or more feed lines 22 extending from the storage chamber 16 to flow the product therethrough. This allows for stocking the storage chambers 16 with product without pouring the product into the storage chambers 16, thereby reducing spillage. The first zone 14 is separated from a second zone 24 by check valves 26 in the feed lines 22, which allow for only one way product flow from the first zone 14 into the second zone 24, but not vice versa.

The second zone 24 includes a pump 28 to urge the flow of product from the storage chambers 16. The pump 28 may alternatively be located in the first zone 14, for example, between the storage chambers 16 and check valve 26. Further, in some embodiments, the machine 10 may be gravity fed and the pump 28 omitted. The second zone 24 further includes a gas introduction line 30 to mix a gas, such as air or carbon dioxide, with the product flowing through the feed lines 22. Mixing of the gas with the product aids in quick freezing of the product, provides some texture to the frozen product and increases yield for an operator of the machine 10. Downstream of the gas introduction line 30, the feed lines 22 extend from the second zone 24 into a third zone 32, which contain a freezing cylinder 34. The second zone 24 is separated from the third zone 32 by a freezing cylinder valve 36 located along the feed lines 22. The freezing cylinder 34 freezes the product flowing into it from the feed lines 22 and a dispenser valve 38 is located downstream of the freezing cylinder 34 to dispense frozen product therefrom. While the gas introduction line 30 is shown in the second zone 24 in FIG. 1, it is to be appreciated that this placement is merely exemplary. In other embodiments, the gas introduction line 30 is positioned in the third zone 32 upstream of the freezing cylinder 34.

Figure 2:
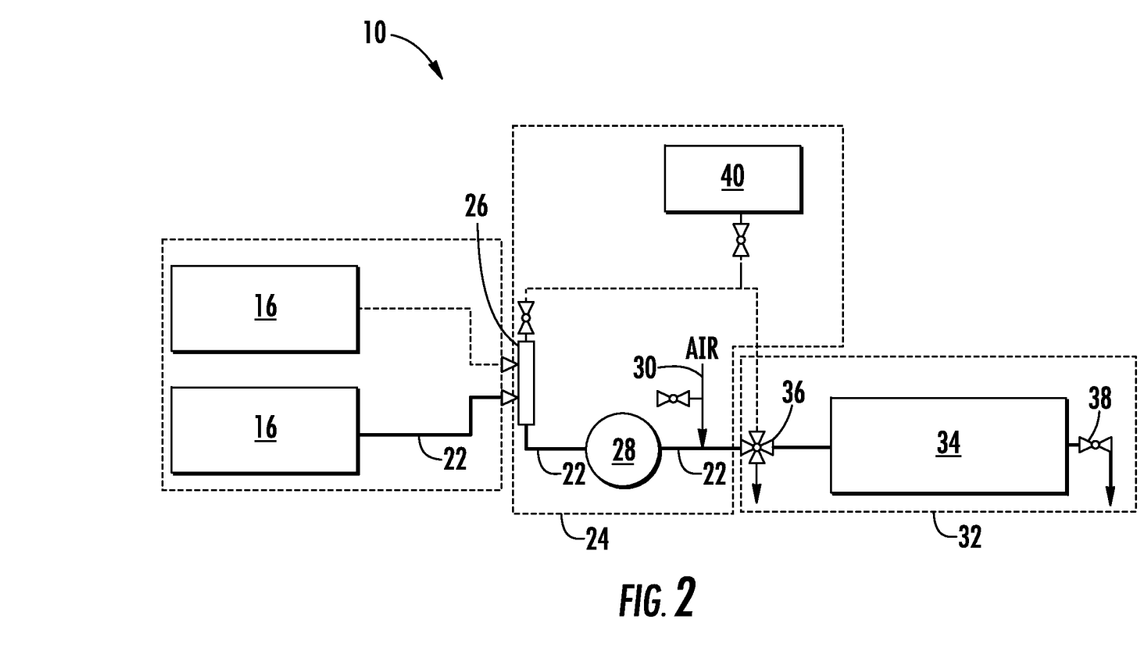
FIG. 2 is a schematic illustration of flow through an embodiment of a frozen food dispenser during normal operation.

FIG. 2 illustrates normal operation of the machine 10 during which product is dispensed therefrom. Product is flowed from the storage chambers 16 through check valve 26 and pump 28. Gas is injected into the feed lines 22 to mix with the product at the gas introduction line 30. The product then proceeds through the freezing cylinder valve 36 and into the freezing cylinder 34. The product is frozen in the freezing cylinder 34 then dispensed through the dispenser valve 38.

Figure 3:
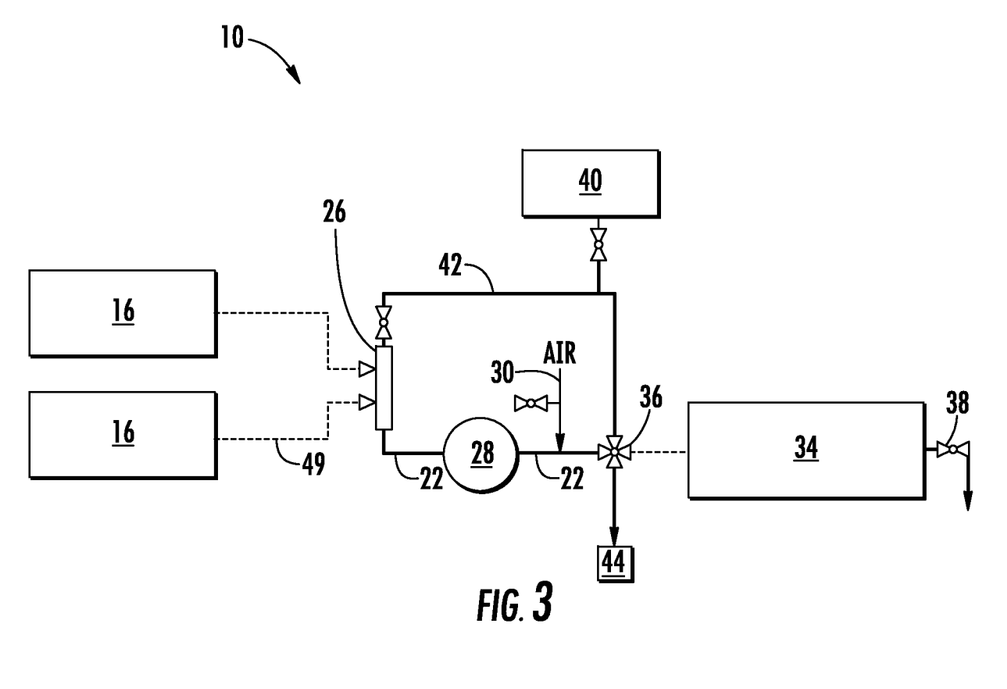
FIG. 3 is a schematic illustration of a flow to flush product from a zone of an embodiment of a frozen food dispenser.
Figure 4:
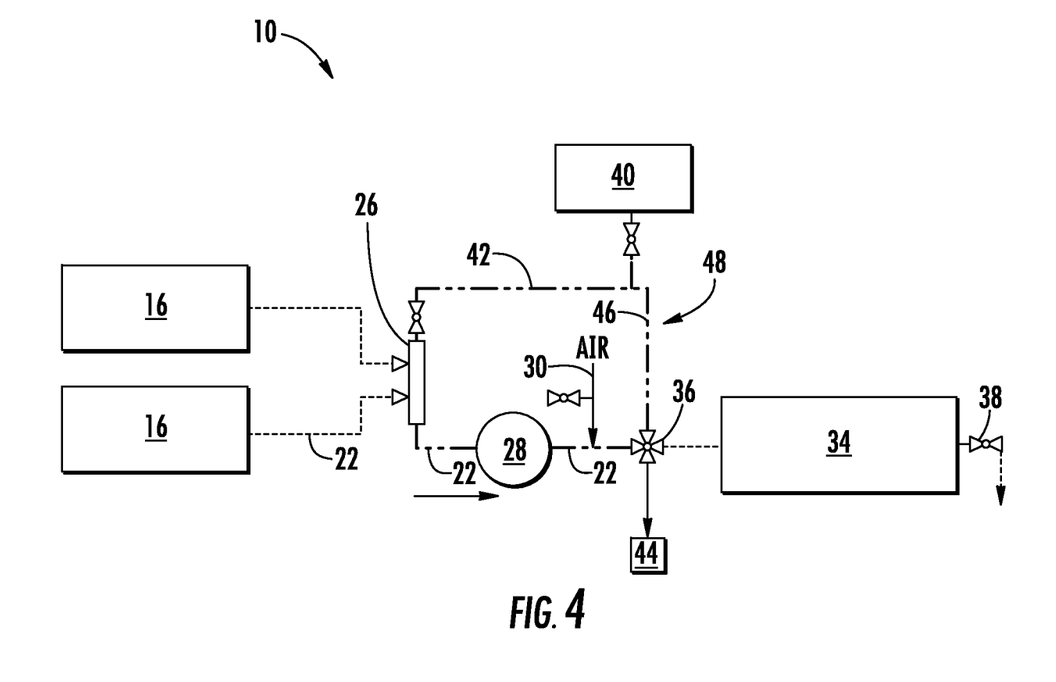
FIG. 4 is a schematic illustration of a sanitizer flow through a zone of and embodiment of a frozen food dispenser.
Figure 5:
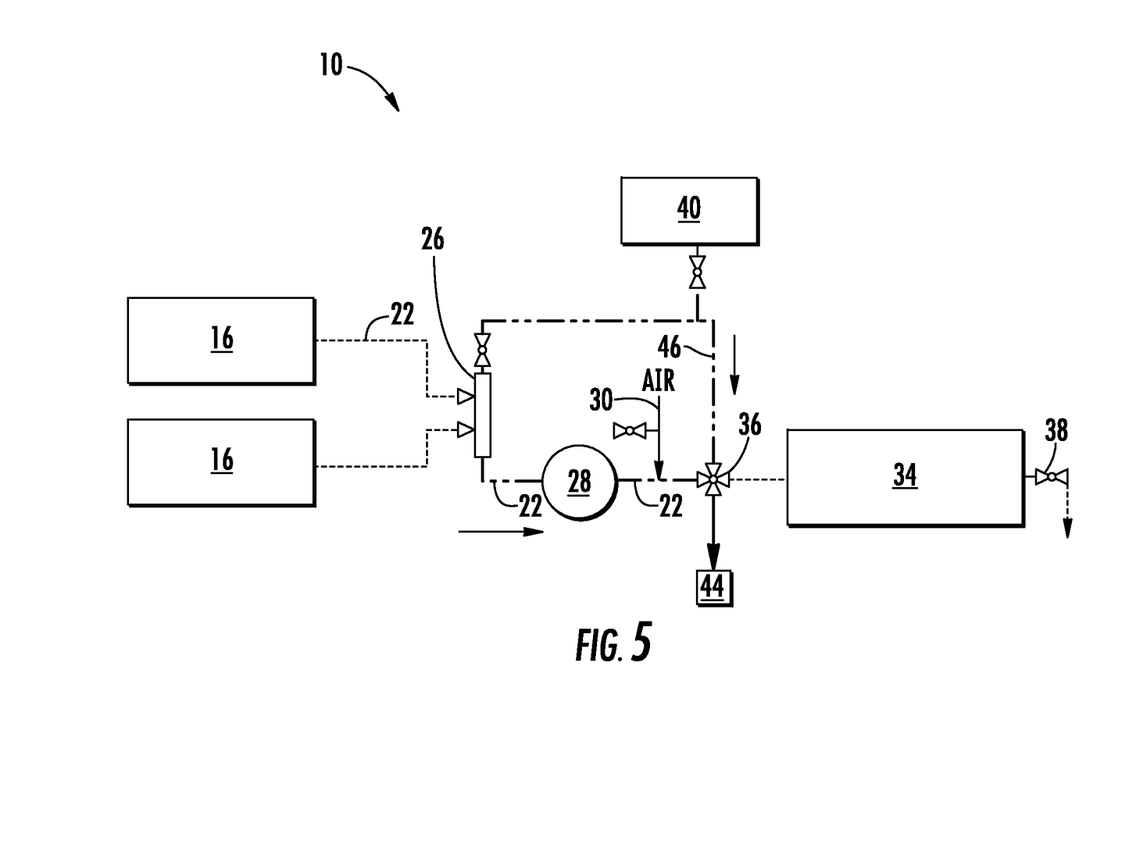
FIG. 5 is a schematic illustration of a sanitizer drain from a zone of an embodiment of a frozen food dispenser.

At a selected interval, for example, daily, the second zone 24 is flushed and sanitized. Referring to FIG. 3, a flow of sanitizer and/or water is urged from a sanitizer source 40 through a sanitizer conduit 42 that intersects the feed lines 22 at or near the check valve 26. The check valve 26 prevents flow of sanitizer upstream toward the storage chambers 16. The flow of sanitizer continues through the feed lines 22 through the pump 28 and to the freezing cylinder valve 36. The freezing cylinder valve 36, a four way valve, is closed to the freezing cylinder 34 and opened to waste 44. The flow of sanitizer and/or water flushes any product remaining in the second zone 24 from the machine 10. Referring to FIG. 4, once the product is flushed from the second zone 24, the freezing cylinder valve 36 is closed to waste 44 and opened to return conduit 46 defining a closed sanitation loop 48 with the sanitizer conduit 42 and feed lines 22. The sanitation loop 48 is filled with sanitizer and circulated via the pump 28 for a selected cycle time. When the cycle time is complete, the freezing cylinder valve 36 is opened to waste 44 and the sanitizer is drained from the second zone 24, as shown in FIG. 5.

Figure 6:
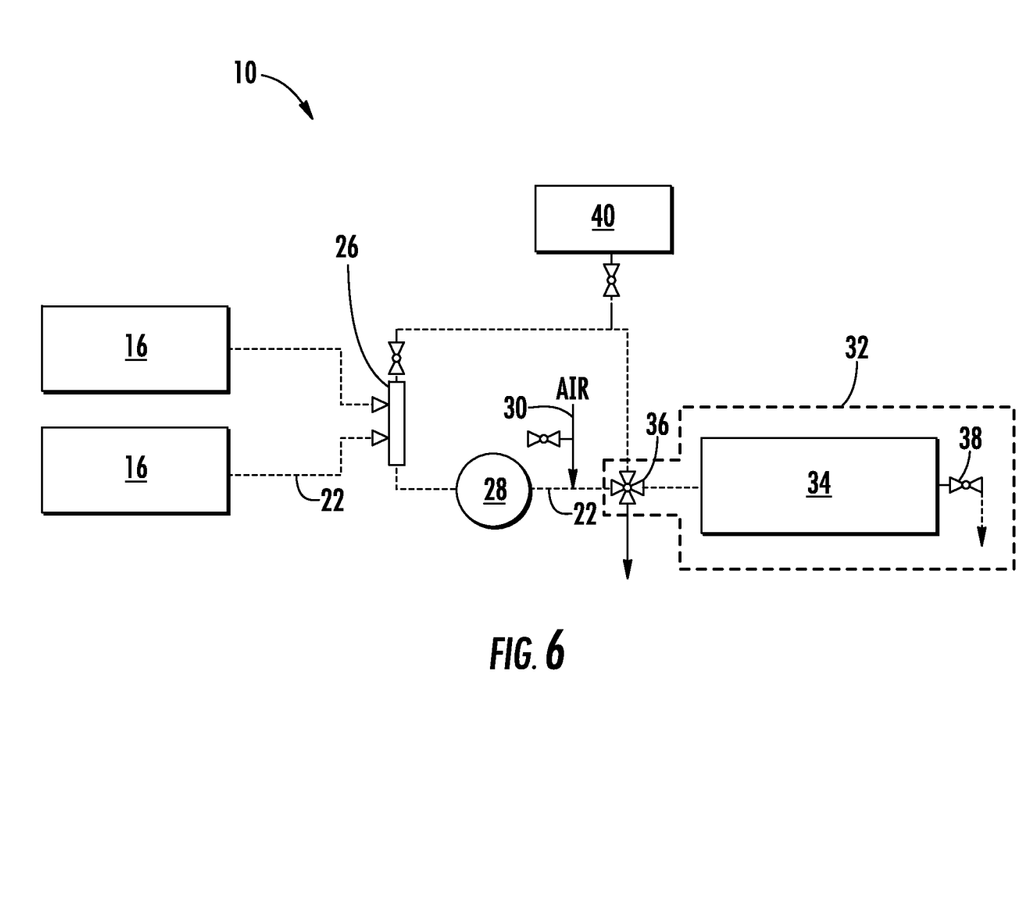
FIG. 6 is a schematic illustration of a heat treatment cycle for a freezing cylinder zone of an embodiment of a frozen food dispenser.
Figure 7:
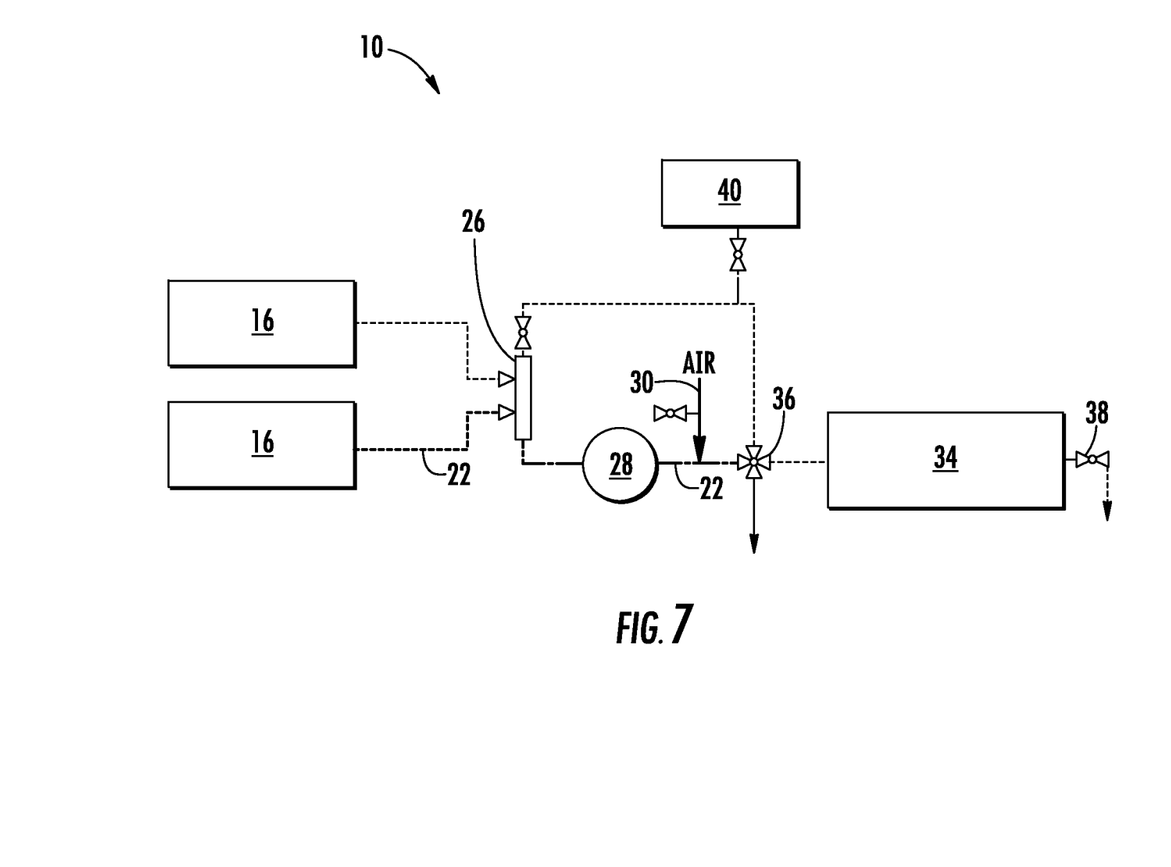
FIG. 7 is a schematic illustration of a priming of an embodiment of a frozen food dispenser.

Referring now to FIG. 6, when the sanitizer is drained from the second zone 24, the third zone 32 is isolated and a heat treatment cycle is performed on the third zone 32 only to ensure cleanliness of the third zone 32 and the product therein. Referring now to FIG. 7, once the heat treat cycle is completed, a volume of product is fed through the machine 10 from the storage chambers 16 through the dispenser valve 38 thereby priming the machine 10.

Separating the machine 10 into the first zone 14, a refrigerated storage zone; the second zone 24, a sanitizable product flow zone; and a heat treatable third zone 32, results in reduced contamination from zone to zone, for example from the second zone 24 to the first zone 14. The arrangement also reduces product waste during cleaning, and since only the third zone 32 is heat treated, a shorter heat treat cycle time due to the smaller heat treated volume. While embodiments above describe heat treating only the third zone 32, in other embodiments both the second zone 24 and the third zone 32 are heat treated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A frozen food dispensing machine comprising:
    a refrigerated first zone including a product storage chamber;
    a second zone operably connected to the first zone for flowing product from the first zone; and
    a third zone configured to:
        receive a flow of product from the second zone;
        freeze the flow of product; and
        dispense the flow of product;
    the second zone including:
        one or more product feed lines in flow communication with the first zone and the third zone;
        a check valve disposed at the one or more product feed lines to prevent flow from the second zone into the first zone;
        a pump downstream of the check valve to urge the flow of product from the first zone into the second zone; and
        a sanitizer source and a sanitizer conduit extending therefrom, the sanitizer conduit intersecting the one or more product feed lines at or near the check valve and configured to flush the second zone with a flow of sanitizer from the sanitizer source via operation of the pump;
    wherein the first zone, the second zone and the third zone are isolatable from each other.

2. The machine of claim 1, further comprising a freezing cylinder valve disposed at the one or more product feed lines configured to isolate the second zone from the third zone.

3. The machine of claim 1, wherein the third zone and/or the second zone is configured to be heat treatable.

4. A method of operating a frozen food dispensing machine comprising:
    urging a flow of product from a refrigerated first zone into a second zone via operation of a pump disposed in the second zone;
    conveying the flow of product through the second zone and into a third zone via one or more product feed lines;
    freezing the product in a freezing cylinder in the third zone;
    dispensing the product from the third zone;
    fluidly isolating the second zone from the first zone and the third zone; and
    flushing the second zone with a flow of sanitizer from a sanitizer source and sanitizer conduit disposed in the second zone while the second zone is fluidly isolated from the first zone and the third zone via operation of the pump;
    wherein the first zone, the second zone and the third zone are isolatable from each other, the first zone isolated from the second zone via a check valve disposed at the one or more product feed lines between the pump and the first zone.

5. The method of claim 4, further comprising:
    isolating the second zone from the third zone via a freezing cylinder valve disposed at the one or more product feed lines.

6. The method of claim 4, further comprising flushing product from the second zone to waste.

7. The method of claim 4, further comprising draining the sanitizer from the second zone to waste.

8. The method of claim 7, further comprising priming the machine by flowing a flow of product from the first zone into the second zone.

9. The method of claim 4, further comprising heat treating the third zone and/or the second zone.

* * * * *